United States Patent Office 2,795,821
Patented June 18, 1957

2,795,821

PRODUCTION OF EXTRUDED SHAPES HAVING TEXTURED SURFACES WITHOUT RECOURSE TO EXTERNAL MECHANICAL DEVICES, SUCH AS EMBOSSING ROLLS AND THE LIKE

Thomas C. Williams, Jr., Ramsey, N. J., assignor to The Okonite Company, Passaic, N. J., a corporation of New Jersey No Drawing. Application March 16, 1954,
Serial No. 416,706

3 Claims. (Cl. 18—55)

The present invention relates to the production of extruded shapes having a textured surface without the necessity of recourse to external mechanical devices, such as embossing rolls or the like, for example.

More particularly, the present invention relates to the production of extruded shapes from plastics, the invention providing a method whereby such shapes are produced with a textured or grained surface, such as is desirable in shoe welts, belting, and the like.

It is to be understood before proceeding further with this description that in the practice of my invention one is not limited to the use of any specific type or form of extrusion apparatus.

More specifically, the present invention is directed to the production of extruded shapes wherein the starting material employed is a basic thermoplastic resin, such as a thermoplastic polymer or a blend of such polymers.

I have found that, if a polymer having certain characteristics, to be hereinafter referred to, is incorporated with or into a compound the principal ingredient of which is a basic thermoplastic resin, the compound also comprising other ingredients, such as plasticizers, softeners, pigments, etc., the extruded product will have a textured or grained surface. For purposes of this description the added polymer will be referred to as a texture-producing agent.

As will be brought out more fully later on in this description, I have found that it is necessary for the texture-producing agent to have certain characteristics, in order to produce an extruded article having a textured surface. Without attempting to set out these characteristics in the order of their importance, I might mention that the added texture-producing agent must be compatible with the ingredients of the compound into which it is incorporated, that is to say, it must be of such a type that it will not cause any deleterious effects so far as the other components of the compound are concerned, such as decrease of desirable physical properties, or bleeding, or spewing. In addition to this characteristic, the texture-producing agent must be "rubbery," that is, it must possess to a significant degree a rapid, highly elastic component of retraction following extension and release of the extending force. The texture-producing agent must also possess to a high degree a property generally referred to as "nerve," which is to be interpreted to mean that the elastic component of retraction I have just referred to must be manifest in the texture-producing agent while the agent is in an unvulcanized state.

A further characteristic which I have found essential in the texture-producing agent which I desire to employ is that the "nerve" of the agent must be sensitive to temperature, viz., must either remain constant or increase as the temperature of the agent increases, but within certain temperature ranges.

As above pointed out, the textured surface resulting from the practice of my invention is entirely independent of embossing rolls or other mechanical devices.

I have referred to "nerve" as one of the necessary characteristics of the rubbery polymer which I employ as a texture-producing agent. This characteristic is easily detected by a simple test: for example, by placing a suitable quantity of the polymer on a two-roll rubber mill to form a complete band on one roll without any excess material being in the bite of the rolls. The surface of this band, if the texture-producing agent is one possessing "nerve," presents a rough, knotty, or grainy surface. The band may be removed from the mill roll as a rectangular sheet, for instance, and the speed of decreasing length of the sheet from the original length observed. In a texture-producing agent having a high degree of "nerve," the decrease in length will be very rapid at first and then may be slower, whereas an agent having a low degree of "nerve" will contract at a relatively slow rate or even not at all. The agent that I intend to employ will exhibit a larger total amount of contraction than an agent of low "nerve."

With reference now to a more detailed description of my improved process. A compound comprising a basic thermoplastic resin as its principal ingredient, plasticizers, softeners, etc., and the texture-producing agent is fused, by heating and mechanically working, so as to cause consolidation of the soluble components of the compound and dispersion of the insoluble components of the compound. After fluxing has been accomplished, the temperature of the compound is regulated to a point at which a suitable degree of "nerve" is developed in the texture-producing agent, and, while at this temperature, the compound may be formed into an extruded shape by any conventional plastic extrusion process; the extruded shape is maintained at an elevated temperature at which "nerve" is developed for a time sufficient for a textured surface to develop upon the extruded product; immediately this takes place, the extruded shape is quenched to room temperature, permanently to fix the textured surface.

As a variant from the procedure just described, I may cool the compound in the form of thin sheets, after the compound has been fluxed. These sheets may then be stored or chopped into small granules and stored. At a later time, the temperature of the sheets or of the granules may be regulated to develop "nerve," after which I proceed as previously described.

In the case of the cold sheets, temperature regulation is usually accomplished by heating in an air oven, or heating in a liquid bath, or by working on a heated mill or internal mixer.

In the case of granules, temperature regulation is usually accomplished in the extrusion machine, a portion of the apparatus being devoted to a working and warming operation.

Prior to charging to the extrusion machinery, the granules may or may not be partially preheated by contacting with a current of heated gases.

I have successfully produced extruded plastic bodies having a textured surface by employing a high-molecular-weight polyvinyl chloride (Geon 101, B. F. Goodrich Chemical Company) as the main ingredient of the starting compound from which the extruded article is to be made and a high-molecular-weight co-polymer of butadiene and acrylonitrile (Hycar 1001, B. F. Goodrich Chemical Company), which I found to manifest a high degree of temperature-sensitive "nerve." The various components of the compound, including the texture-producing agent, were blended in a ribbon mixer at room temperature. The resulting rough pre-blend was then charged to a two-roll plastic mill, which was heated to 300° F., and the mass worked until it was entirely fluxed, at which time the temperature was 312° F. I then transferred this hot mass to a second mill, heated to 320° F., where it was worked until it reached a temperature of 340° F. The compound was then fed to an extruder, heated to a temperature of 370° F., which was above the fusing temperature employed, and the compound extruded, the temperature of the compound issuing from the extrusion orifice being approximately 355° F. The extruded shape was maintained between 345° F. and 355° F. until a textured surface was formed. The time required for this to take place was 2½ seconds. Immediately upon the formation of the textured surface, the shape was quenched to room temperature, to fix the textured surface.

In this work I employed the following materials in the proportions indicated, which are set out as parts by weight:

| | | |
|---|---|---|
| Geon 101 (polyvinyl chloride) | 182.0 | thermoplastic resin. |
| Di-2 ethyl hexyl phthalate | 30.0 | plasticizers. |
| Epoxydized soya oil | 52.5 | |
| Calcined kaolin | 10.0 | inert filler. |
| Tribasic lead sulfate | 15.0 | stabilizer. |
| Lead stearate | 0.0625 | lubricant. |
| Iron oxide color pigments | 4.875 | pigment. |
| Butadiene-acrylonitrile copolymer rubber (Hycar 1001) | 25.0 | texture-producing agent. |

In order that I might test the accuracy of my observations, I went through the same procedure with an identical compound, but instead of extruding with the extruder at 370° F. and with the temperature of the compound issuing from the extrusion orifice at 355° F., I extruded at a temperature of 310° F. A textured surface did not develop, regardless of whether or not the extruded shape was immediately quenched to room temperature.

I then tried extruding the compound at an issuing temperature of 355° F. and quenched immediately. Here again, a smooth surface showing no texture was produced.

I then extruded a compound at an issuing temperature of 355° F. and immediately quenched one side of the extruded shape, while the opposite side of the same shape was allowed to remain at between 345° F. and 355° F. for approximately 2½ seconds. The side which had been immediately quenched was smooth and without texture, while the other side, which was maintained between 345° F. and 355° F. for 2½ seconds and then quenched displayed the desired uniform, grainy texture.

As a further test, two batches of the above compound without the texture-producing agent were extruded, one at 310° F., the other at 355° F. The extruded product in each case was retained at these respective temperatures for two seconds. In both instances, a smooth, glossy surface without the desired surface texture was formed or produced.

I wish it to be understood that the compound which has been set out above is not to be construed as limiting my invention to this compound so far as the ingredients as well as proportions of ingredients are concerned. My invention is satisfied if the main ingredient of the compound is a basic thermoplastic resin, and if the texture-producing agent is a material having the characteristics which I have hereinabove described.

What I claim is:

1. The method of producing extruded shapes having a textured surface, which method comprises fluxing a mixture comprising polyvinyl chloride, 182.0 parts by weight, and butadiene-acrylonitrile, 25.0 parts by weight; working the mass until it reaches a temperature of around 340° F.; extruding to the desired shape at an elevated temperature; maintaining the extruded shape at a temperature of between 345° F. and 355° F. for substantially two and one-half seconds; and immediately quenching to room temperature.

2. The method of producing extruded shapes having a textured surface, which method comprises fluxing an admixture of a thermoplastic resin, a plasticizer, and a copolymer of butadiene-acrylonitrile; extruding to the desired shape at a temperature slightly higher than fluxing temperature; maintaining the extruded shape at approximately extrusion temperature for approximately two and one-half seconds; and then quenching to room temperature.

3. The method of producing extruded shapes having a textured surface, which method comprises fluxing and working an admixture comprising polyvinyl chloride and butadiene-acrylonitrile until the mass reaches a temperature of around 340° F.; extruding to the desired shape at an elevated temperature; maintaining the extruded shape at a temperature of between 345° F. and 355° F. for substantially two and one-half seconds; and immediately quenching to room temperature.

References Cited in the file of this patent

UNITED STATES PATENTS

| | | |
|---|---|---|
| 2,105,310 | Chesler | Jan. 11, 1938 |
| 2,265,436 | Loblein | Dec. 9, 1941 |
| 2,342,478 | Metz | Feb. 22, 1944 |